(12) United States Patent
Das et al.

(10) Patent No.: US 8,930,036 B2
(45) Date of Patent: Jan. 6, 2015

(54) RECONFIGURABLE INTERFACE-BASED ELECTRICAL ARCHITECTURE

(75) Inventors: Dipankar Das, Aundh (IN); Vinod Kumar Agrawal, Bangalore (IN); Seetharaman Rajappan, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 539 days.

(21) Appl. No.: 13/086,037

(22) Filed: Apr. 13, 2011

(65) Prior Publication Data

US 2012/0265359 A1 Oct. 18, 2012

(51) Int. Cl.
G06F 1/30 (2006.01)
G06F 1/26 (2006.01)
G05B 19/042 (2006.01)
G06F 13/00 (2006.01)

(52) U.S. Cl.
CPC ............ *G60R 16/023* (2013.01); *G05B 19/042* (2013.01); *G06F 13/00* (2013.01)
USPC ................. 700/292; 701/33; 701/34; 701/39; 701/92

(58) Field of Classification Search
USPC .................. 701/33, 29, 32, 34, 35, 39, 92, 30
See application file for complete search history.

(56) References Cited

U.S. PATENT DOCUMENTS 5,957,985 A * 9/1999 Wong et al. ................. 701/29.2
6,614,796 B1 * 9/2003 Black et al. ................. 370/403
6,999,906 B2 * 2/2006 Koehler et al. .............. 702/193
7,313,467 B2 * 12/2007 Breed et al. ...................... 701/1
8,271,701 B1 * 9/2012 Nguyen et al. ................ 710/52
2010/0292867 A1 11/2010 Boehm
2012/0047435 A1 * 2/2012 Holladay et al. ............. 715/716

FOREIGN PATENT DOCUMENTS

CN 101075206 A 11/2007
DE 103 59 875 A1 7/2005
EP 1125784 A2 * 8/2001

* cited by examiner

*Primary Examiner* — Eduardo Colon Santana
*Assistant Examiner* — Said Bouziane
(74) *Attorney, Agent, or Firm* — John A. Miller; Miller IP Group, PLC

(57) ABSTRACT

An electrical network architecture including a reconfigurable interface layer, along with a corresponding reconfiguration methodology. The interface layer is comprised of reconfigurable interface devices which allow a plurality of sensors and actuators to communicate with a plurality of control units. Each sensor or actuator is connected to multiple interface devices, which in turn are connected to a bus. The control units are also connected to the bus. In the event of an interface device failure, other interface devices can be reconfigured to maintain communication between sensors, actuators and control units. In the event of a control unit failure, the interface devices can be reconfigured to route sensor and actuator message traffic to a different control unit which can handle the functions of the failed control unit. The overall number of control units can also be reduced, as each control unit has flexible access to many sensors and actuators.

16 Claims, 5 Drawing Sheets

RECONFIGURABLE INTERFACE-BASED ELECTRICAL ARCHITECTURE

BACKGROUND OF THE INVENTION

1. Field of the Invention

This invention relates generally to an architecture for electrical networks and, more particularly, to an electrical/electronic network architecture for vehicles or other systems which uses a reconfigurable interface layer between sensors/actuators and controllers and allows messages from sensors to be dynamically routed to different controllers, thus offering an opportunity for consolidation of controllers, and providing better fault tolerance in the event of a device failure.

2. Discussion of the Related Art

Modern vehicles include a significant content of electrical and electronic (E/E) systems. These systems include numerous sensors, actuators and controllers which handle everything from unlocking doors to controlling the performance of the engine or suspension. The reliable operation of the E/E systems is very important, as there is often no other way to perform a function on the vehicle if a particular E/E system becomes inoperative.

The proliferation of sensors, actuators and controllers adds a lot of cost and complexity to a vehicle. Traditional E/E network architectures lack the flexibility to gracefully handle device failures, or to adapt as needed to maximize performance or minimize overhead. This is because in traditional architectures, sensors and actuators for a particular sub-system communicate directly with a controller which controls the sub-system. In the event of a failure of such a controller, the affected sub-system's control functions cannot be handled by another controller in the vehicle, because communication with the affected sensors and actuators is lost. In addition, in traditional architectures, consolidation of controllers is not possible, because individual controllers typically do not have access to sensor data from other sub-systems.

There is a need for an E/E network architecture which allows greater fault tolerance through dynamic reconfiguration, and an opportunity for integration of controllers.

SUMMARY OF THE INVENTION

In accordance with the teachings of the present invention, an electrical network architecture including a reconfigurable interface layer is disclosed, along with a corresponding reconfiguration methodology. The interface layer is comprised of multiple reconfigurable interface devices which allow a plurality of sensors and actuators to communicate with a plurality of control units. Each sensor or actuator is connected to multiple interface devices, which in turn are connected to a bus. The control units are also connected to the bus. In the event of an interface device failure, other interface devices can be reconfigured to maintain all necessary communication between sensors, actuators and control units. In the event of a control unit failure, the interface devices can be reconfigured to route sensor and actuator message traffic to a different control unit which can handle the functions of the failed control unit. The overall number of control units can also be reduced, as each control unit has flexible access to many sensors and actuators.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a reconfigurable interface-based electrical architecture is merely exemplary in nature, and is in no way intended to limit the invention or its applications or uses. For example, the disclosed architecture is described in terms of automotive applications, but the architecture is equally applicable to non-automotive systems.

Figure 1:
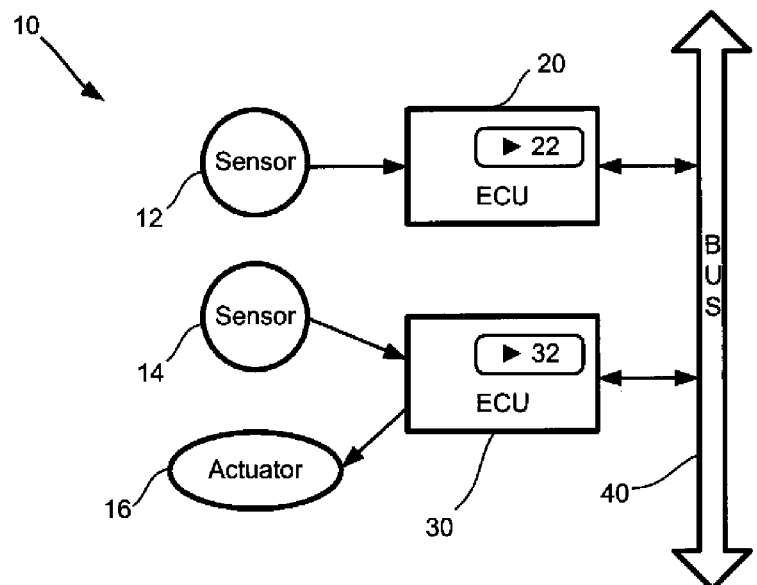
FIG. 1 is a schematic diagram of an electrical architecture typical of those presently used in vehicles.

FIG. 1 is a schematic diagram of an electrical architecture 10 which is typical of those presently used in vehicles and other applications. The architecture 10 includes sensors 12 and 14, actuator 16, electronic control units (ECUs) 20 and 30, and communication bus 40. In this example, the sensor 12 is directly connected to the ECU 20, as the ECU 20 is responsible for performing a function, designated as task 22, which requires data from the sensor 12. Similarly, the sensor 14 and the actuator 16 are directly connected to the ECU 30, which handles task 32, requiring data from the sensor 14 and providing commands to the actuator 16. As would be understood by one skilled in the art, the sensors 12 and 14 provide data about the state of a component or system, such as a temperature or a pressure, while the actuator 16 performs an action, such as unlocking a door or turning on a light.

There are two main disadvantages to the architecture 10. First, in the event of an ECU failure, there is no way to transfer the function performed by the failed ECU to another ECU. This is because, even if a failover ECU was programmed to perform the task of a failed ECU, the failover ECU would not have access to the data it needs to perform the task because some sensors and/or actuators are bound to the failed ECU. For example, if the ECU 30 were to fail, the ECU 20 would not be able to complete the task 32, because the ECU 20 would not have access to data from the sensor 14, and would not be able to issue commands to the actuator 16.

The second disadvantage of the architecture 10 is that it provides a disincentive to combine ECUs, mainly because of the aforementioned lack of failover capability. In other words, system designers are reluctant to combine too many functions on any individual ECU, because all of those functions would be lost in the event the ECU fails. These disadvantages can be overcome with a more flexible architecture.

Figure 2:
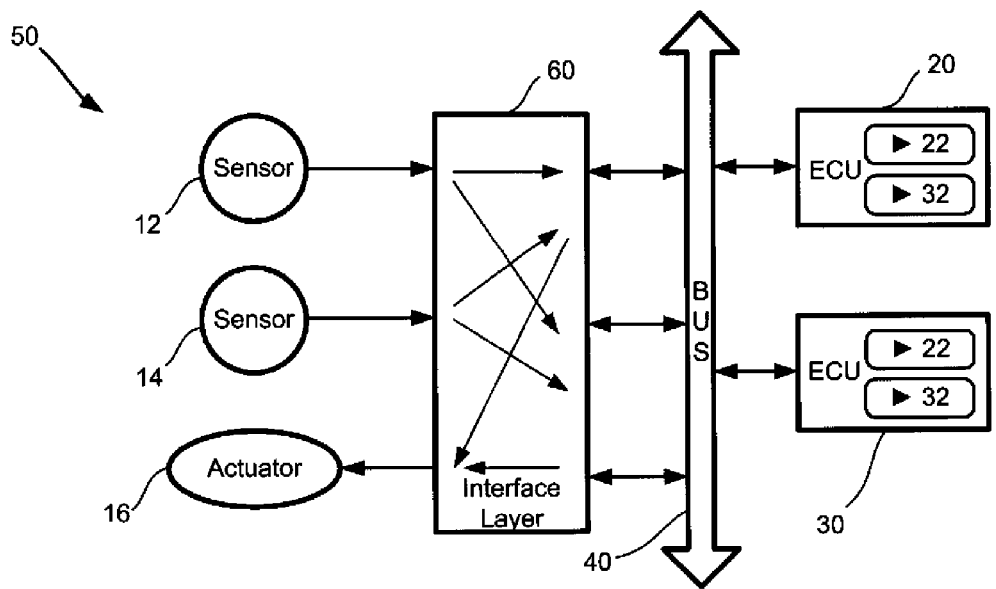
FIG. 2 is a schematic diagram of a proposed electrical architecture which offers more flexibility and fault tolerance than architectures presently available.

FIG. 2 is a schematic diagram of a proposed electrical architecture 50 which offers more flexibility and fault tolerance than architectures presently available. In FIG. 2 and subsequent figures, like elements from previous figures are shown with the same reference numerals. The architecture 50 adds a flexible interface layer 60 between the sensor/actuator layer and the bus 40. That is, the sensors 12 and 14, and the actuator 16 connect to the flexible interface layer 60, which provides data from the sensors 12 and 14 to the bus 40, and provides data from the bus 40 to the actuator 16. In the architecture 50, the ECU layer communicates with the bus 40; thus, the ECUs 20 and 30 can get whatever sensor data they need as long as it is put on the bus 40 by the interface layer 60. Likewise, the ECUs 20 and 30 can put commands for any actuator on the bus 40, and the interface layer 60 will ensure that the commands are delivered to the proper actuator.

The architecture 50 offers the flexibility to route data and tasks to different ECUs in the event one ECU fails, thus providing better fault tolerance, and opening the door to ECU integration and consolidation. For example, the ECUs 20 and 30 can both be programmed with the software necessary to run the tasks 22 and 32. Now consider the case described above for the architecture 10 where, under ordinary conditions, the ECU 20 runs the task 22 using data from the sensor 12, and the ECU 30 runs the task 32 using data from the sensor 14 and providing commands to the actuator 16. As discussed above, with the architecture 10, if the ECU 30 fails, there is no way for the ECU 20 to execute the task 32. However, with the architecture 50, if the ECU 30 fails, the interface layer 60 can still put data from the sensor 14 on the bus 40, and route that data to the ECU 20. The ECU 20 can then run the task 32 and provide command output for the actuator 16, which can be put on the bus 40 and routed to the actuator 16 by the interface layer 60. In this scenario, the ECU 20 also runs its own native task, that is, the task 22.

Thus, the architecture 50 provides fault tolerance which is not possible with the architecture 10. In addition, the architecture 50 provides an opportunity for a significant consolidation in the number of ECUs. For example, most modern vehicles include many microcontrollers scattered around the vehicle, where each microcontroller performs a control function for a certain sub-system. These microcontrollers typically cannot be consolidated or integrated, because each microcontroller is only connected to the sensors and actuators for its specific sub-system. Using the architecture 50, any controller can communicate with any sensor or actuator within the vehicle, and any controller can in general serve as a failover backup for any other controller. Thus, there is an opportunity to combine several sub-system control functions into a single, up-integrated ECU, which both lowers the cost of the hardware and provides redundancy in case of a failure.

The architecture 50 in FIG. 2 shows the flexible interface layer 60 in a generic form, serving as a sort of "virtual crossbar switch" to connect the sensor/actuator layer with the ECU layer as necessary. The following discussion will describe various embodiments of the architecture 50, and how the communication paths can be reconfigured to provide the desired flexibility and fault tolerance.

Figure 3:
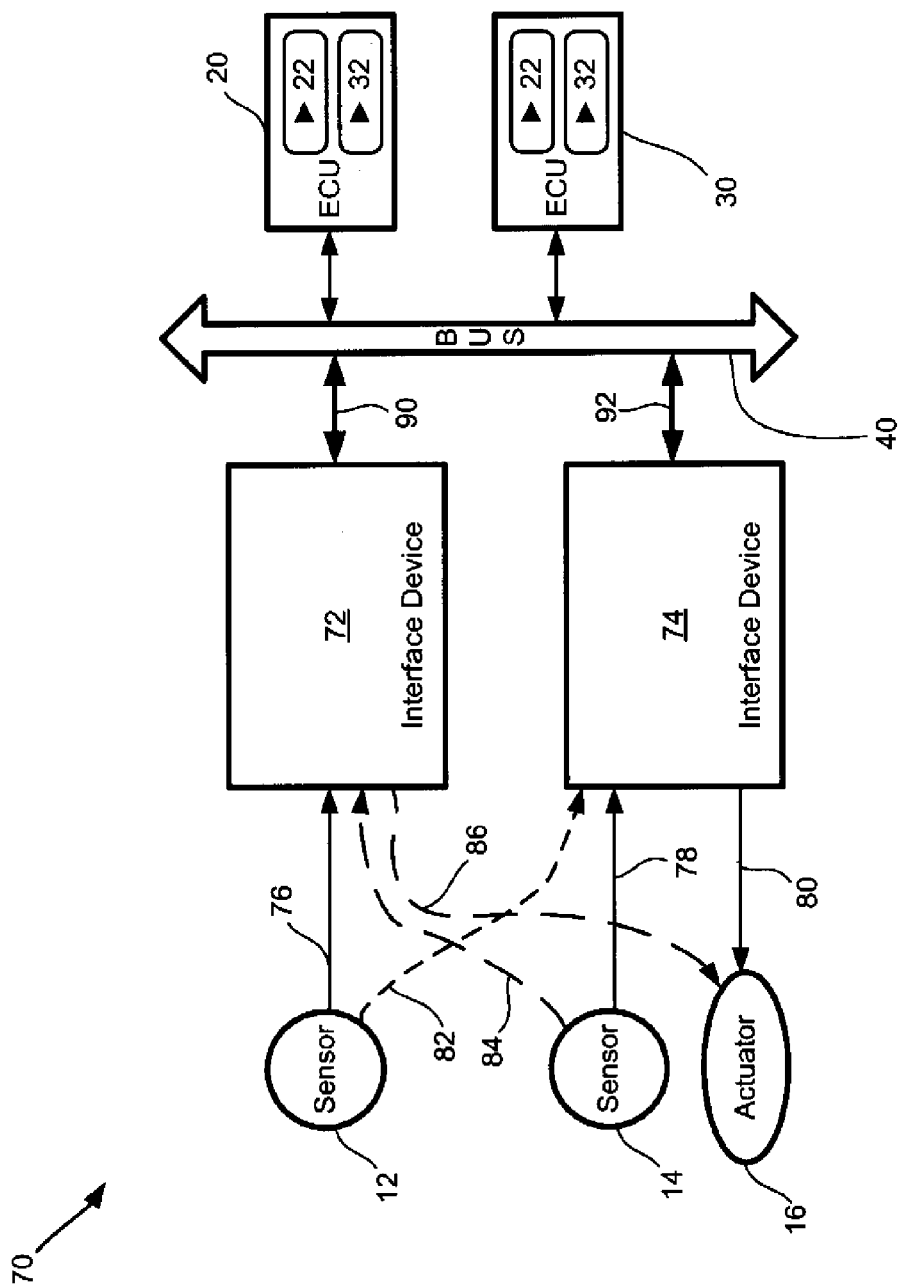
FIG. 3 is a schematic diagram of the architecture shown in FIG. 2, showing how a set of universal interface devices are used to provide the flexibility and fault tolerance.

FIG. 3 is a schematic diagram of an architecture 70 representing one embodiment of the flexible and fault tolerant architecture shown in FIG. 2. In the architecture 70, the flexible interface layer 60 is comprised of a set of universal interface devices, specifically, interface devices 72 and 74. The interface devices 72 and 74 can each be configured to route data messages from either or both of the sensors 12 and 14 to either the ECU 20 or 30, and to route command messages from either the ECU 20 or 30 to the actuator 16. For example, in a normal mode of operation, with all devices working properly, the interface device 72 would receive data on line 76 from the sensor 12, and send the data via a message on the bus 40 destined for the ECU 20. Meanwhile, the interface device 74 would receive data on line 78 from the sensor 14, and send the data via a message on the bus 40 destined for the ECU 30. And the ECU 30 would put actuator commands on the bus 40 which would be picked up by the interface device 74 and routed on line 80 to the actuator 16.

The fault tolerance or failover capabilities can be explained by way of some examples. If, for example, the ECU 30 fails, the ECU 20 responds by sending a message to the interface device 74 instructing it to route all messages to the ECU 20 instead of the ECU 30. At the same time, the ECU 20 will begin executing any tasks, such as the task 32, which were previously running on the ECU 30. Thus, data from the sensor 14 will be put on the bus 40 by the interface device 74 via a message destined for the ECU 20. The ECU 20 will use the data from the sensor 14 to execute the task 32, and will issue a command for the actuator 16 in a message on the bus 40. The message containing the command for the actuator 16 will be picked up by the interface device 74 and provided to the actuator 16. The ECU 20 will perform the operations associated with the task 32 in addition to its normal execution of the task 22.

The architecture 70 can also handle failure of an interface device, as illustrated here. If, for example, the interface device 72 fails, the ECU 20 will send a message to the interface device 74 instructing it to activate its data channel for the sensor 12, and to send data from the sensor 12 to the ECU 20. Thus, the interface device 74 will begin receiving data from the sensor 12 on line 82, and will send that data in messages destined for the ECU 20 via the bus 40. Similarly, if the interface device 74 fails, the interface device 72 will be instructed to begin communicating with the sensor 14 and the actuator 16, on lines 84 and 86 respectively. In the case of an interface device failure, the sensor/actuator channel usage and message routing change, but the tasks performed by the ECUs remain the same as in a normal operational situation.

A heartbeat-type approach could be used to allow detection of a failure of an interface device or an ECU. All message traffic between the interface device 72 and the bus 40 is carried on line 90, and all message traffic between the interface device 74 and the bus 40 is carried on line 92. All messages on the bus include a source device and a destination device in the message itself, in standard communication bus fashion. The flexible routing of messages by the interface devices 72 and 74 is accomplished by way of reconfigurable message tables and reconfigurable channel use tables, as will be discussed below.

It is to be understood that, in a complete vehicle or system, many more interface devices, sensors, actuators and ECUs may exist than are shown in FIG. 3 and the other architecture figures. The devices and connections can be replicated according to the examples given. It is also to be understood that an actuator device can include internal sensors, in which case data would need to flow both to and from such a device. Furthermore, the use of the term "line" in the discussion denotes a logical connection between two devices, and is not meant to imply a single physical wire. These extensions would be well understood by those skilled in the art of electrical network architecture.

Figure 4:
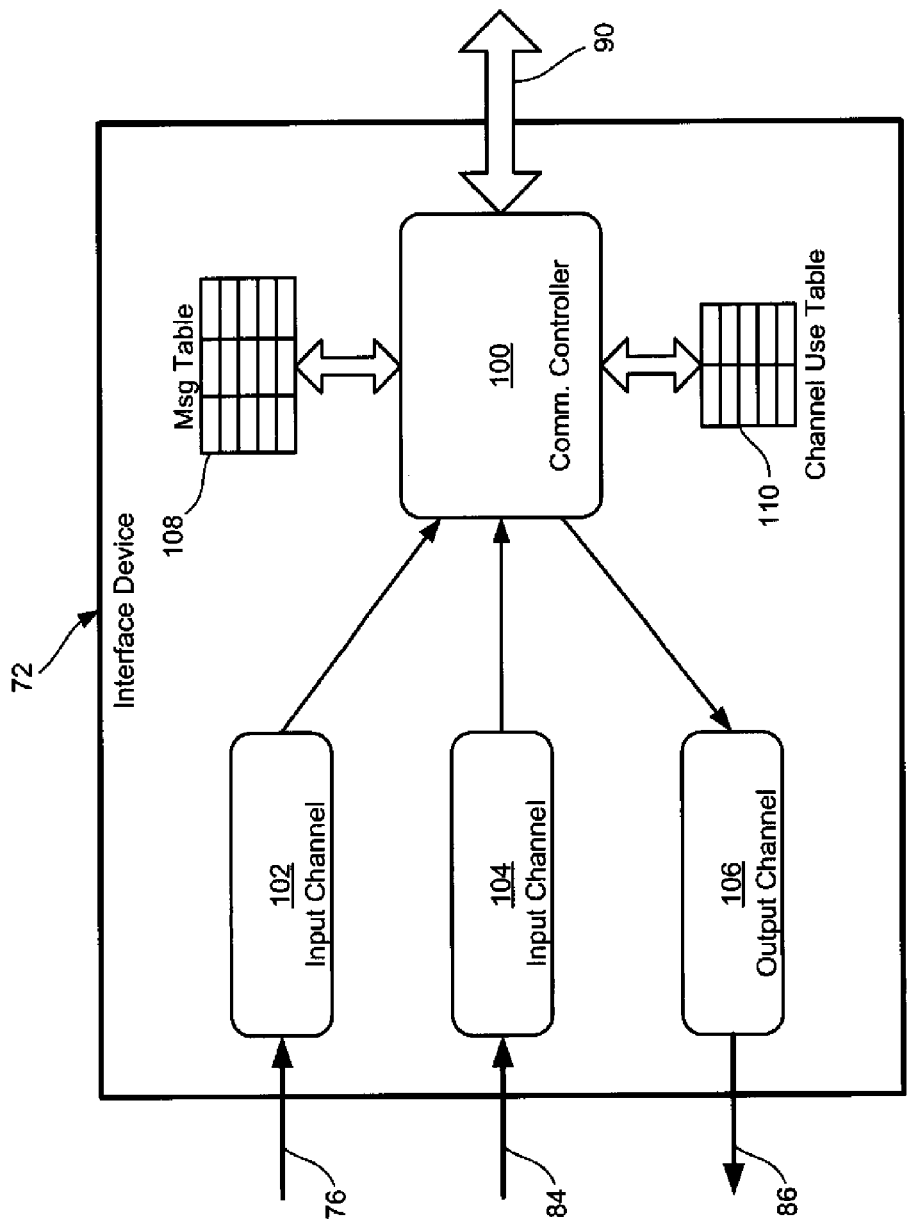
FIG. 4 is a schematic diagram of one of the universal interface devices shown in FIG. 3, showing how the device handles internal and external communication, and reconfiguration.

FIG. 4 is a schematic diagram of the interface device 72 shown in FIG. 3, showing how the device 72 handles internal and external communication, and reconfiguration. The interface device 72 includes a communication controller 100 which is the hub of internal and external communications. The interface device 72 also includes input channels 102 and 104, which may be analog-to-digital converters or other types of input channels. The input channel 102 receives data from the sensor 12 on the line 76, as shown in FIG. 3. The input channel 104, if used, receives data from the sensor 14 on the line 84, as shown in FIG. 3 and discussed previously. The interface device 72 also includes an output channel 106, which could be a pulse-width modulation (PWM) driver or other type of output channel. The output channel 106, if used, provides commands to the actuator 16 on the line 86, as shown in FIG. 3 and discussed previously.

The input channels 102 and 104, and the output channel 106, communicate with the communication controller 100, which in turn communicates with the bus 40 via the line 90, as shown in FIG. 3. The communication controller 100 can be programmed to communicate with the bus 40 via any desired protocol—such as the Controller Area Network (CAN) protocol. The interface device 72 also includes a reconfigurable message table 108 and a reconfigurable channel use table 110. The message table 108 maintains a list which maps messages from the sensor/actuator layer to the ECU layer, and vice versa. For example, under normal conditions, the message table 108 would contain an entry which indicates that data from the sensor 12 is to be sent to the ECU 20. Thus, the communication controller 100 would take data from the sensor 12 which is received on the input channel 102, encode that data in a message destined for the ECU 20, and put the message on the bus 40 via the line 90. If the ECU 20 fails, the ECU 30 would send a message to the interface device 72 indicating that the message table 108 should be reconfigured to map data from the sensor 12 to the ECU 30.

The channel use table 110 maintains a list of which input and output channels are to be used by the interface device 72, which sensor or actuator devices are associated with each channel, and the refresh or sampling rate for each sensor or actuator. For example, under normal conditions, the channel use table 110 in the interface device 72 would indicate that the input channel 102 is active, and is connected to the sensor 12. The input channel 104 and the output channel 106 would be inactive under normal conditions, and this information would also be contained in the channel use table 110. In the example discussed previously, if the interface device 74 fails, the interface device 72 would receive a message instructing it to activate the input channel 104 to the sensor 14 and the output channel 106 to the actuator 16; the sampling and refresh rates, respectively, would also be provided. This information would be stored in the channel use table 110. The channel use table 110, in conjunction with the message table 108, allows the communication controller 100 in the interface device 72 to manage input and output channel usage, and to properly route messages to and from the bus 40. The reconfigurability of the interface device 72 thus provides the flexibility and fault tolerance needed in the interface layer 60 discussed previously.

The ECUs 20 and 30 must be able to send messages to the interface device 72 to reconfigure the message table 108 and the channel use table 110 as appropriate. Logic for the reconfiguration messages may be contained in a reconfiguration strategy table (not shown), which indicates what action should be taken for a given device failure. For example, as discussed above, if the interface device 74 fails, the ECU 30 would send messages to the interface device 72 instructing the interface device 72 to activate the input channel 104, activate the output channel 106, route data from the sensor 14 to the ECU 30, and route data from the ECU 30 to the actuator 16. The first two of these messages would be applied to the channel use table 110, while the last two of the messages would be applied to the message table 108. The reconfiguration strategy table in the ECUs 20 and 30 would be populated with the reconfiguration responses necessary for any contingency or fault situation. It is also possible to use a fail-silent interface device configuration strategy. For example, if the interface device 74 fails, the interface device 74 can be instructed to stop communicating, thus avoiding spurious messages on the bus 40.

It is noteworthy that the reconfiguration strategy described above is more efficient than a redundancy-based approach where the interface devices 72 and 74 always send and receive all data from all connected sensors and actuators. First, using the reconfiguration strategy, each of the interface devices 72 and 74 can keep unneeded input and output channels inactive, which conserves power. Second, using the reconfiguration strategy minimizes message traffic on the bus 40. For example, if both the interface devices 72 and 74 received data from both the sensors 12 and 14 and put this data on the bus 40, there would be four messages on the bus 40 for each bus time segment. On the other hand, using the reconfiguration strategy, there are only two sensor data messages on the bus 40—and this is true under normal operating conditions where both the interface device 72 and the interface device 74 each transmit one message to the bus 40, and in a failover situation where, for example, the interface device 72 (having failed) is silent and the interface device 74 transmits two messages (one each for the sensor 12 and the sensor 14) to the bus 40.

Figure 5:
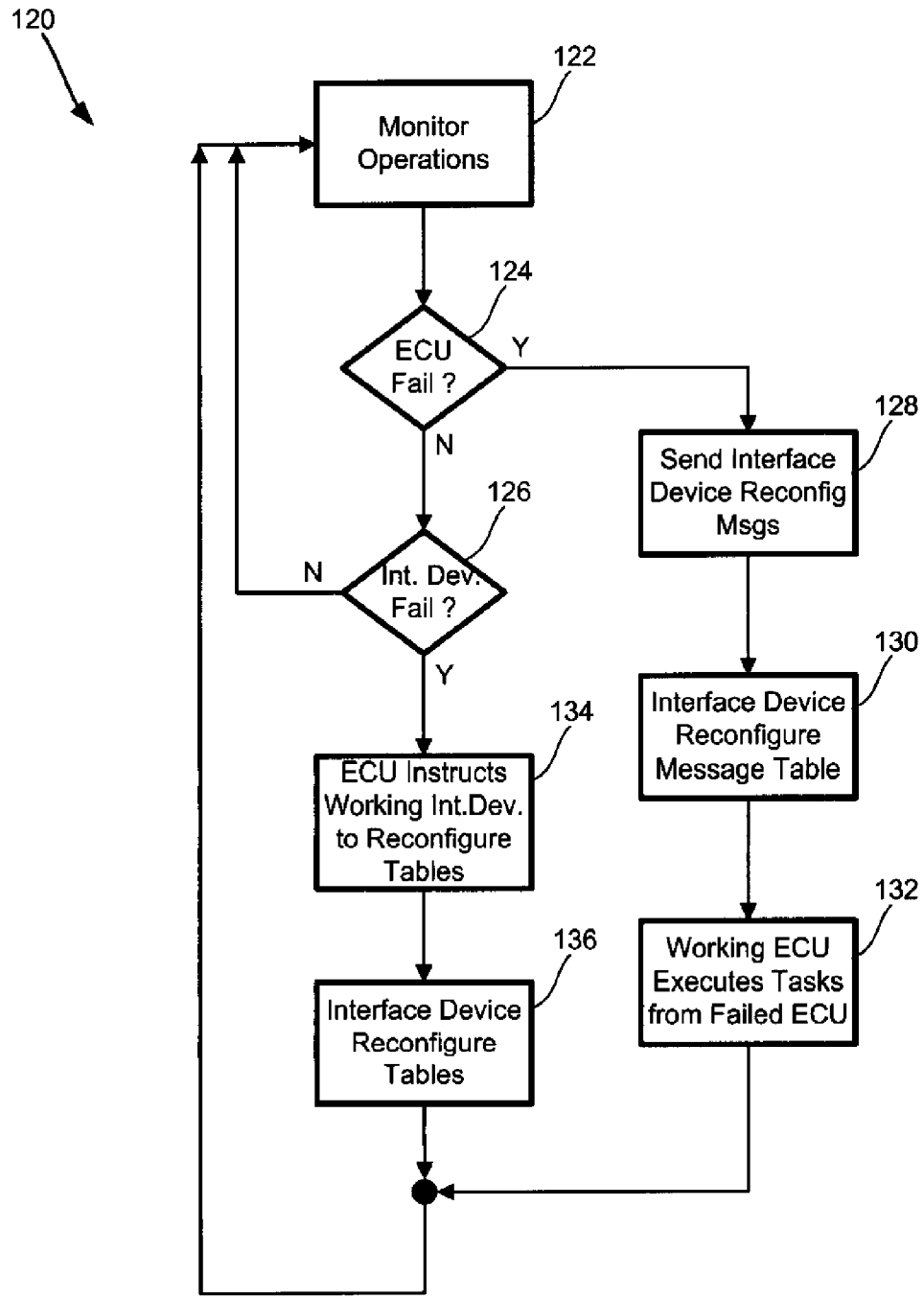
FIG. 5 is a flow chart diagram of a process that can be used to reconfigure the interface devices in the architecture of FIG. 3.

FIG. 5 is a flow chart diagram 120 of a process that can be used to reconfigure devices in the architecture 70 of FIG. 3 in the event of an interface device or ECU failure. The process begins with the interface devices 72 and 74 and the ECUs 20 and 30 working normally. At box 122, operations of the devices are monitored. At decision diamond 124, it is determined whether there has been an ECU failure. If there has been no ECU failure, the process continues to decision diamond 126, where it is determined whether there has been an interface device failure. If there has been no interface device failure, the process loops back to continue monitoring at the box 122.

From the decision diamond 124, if an ECU failure is detected, the process branches to box 128 where a working ECU sends interface device reconfiguration messages. For example, consider a case where the ECU 20 fails. At the box 128, the ECU which is still operating, that is, the ECU 30, sends a message to the interface device 72, instructing it to reconfigure its message table to begin routing to the ECU 30 those messages which had previously been routed to the ECU 20. At box 130, the interface device 72 receives the instruction from the ECU 30 and reconfigures its message table to route data from the sensor 12 to the ECU 30. At box 132, the ECU 30 starts executing any tasks from the failed ECU 20—namely, in this example, the task 22. Following the reconfiguration steps of the boxes 128-132, network operation can continue with full functionality, and the process loops back to continue monitoring at the box 122.

From the decision diamond 126, if an interface device failure is detected, the process continues to box 134 where an ECU sends messages to reconfigure an interface device which is still working. For example, consider a case where the interface device 72 fails. At the box 134, one of the ECUs, such as the ECU 20, sends messages to the interface device which is still operating, that is, the interface device 74, instructing it to reconfigure its channel use table and its message table. At box 136, the interface device 74 would reconfigure its channel use table and its message table according the instructions from the ECU 20 at the box 134. In this example, the interface device 74 would have to reconfigure its channel use table to activate the channel connecting to the sensor 12 on the line 82, and the interface device 74 would have to reconfigure its message table to route message data from the sensor 12 to the ECU 20. Following the reconfiguration steps of the boxes 134-136, network operation can continue with full functionality, and the process loops back to continue monitoring at the box 122.

Again, it is to be understood that the method of the flow chart diagram 120 can be applied to an E/E network with more than two interface devices and two ECUs. In a larger network, the method could be continued after a reconfiguration, and additional reconfigurations could be carried out in the event that another ECU or interface device was to fail.

Figure 6:
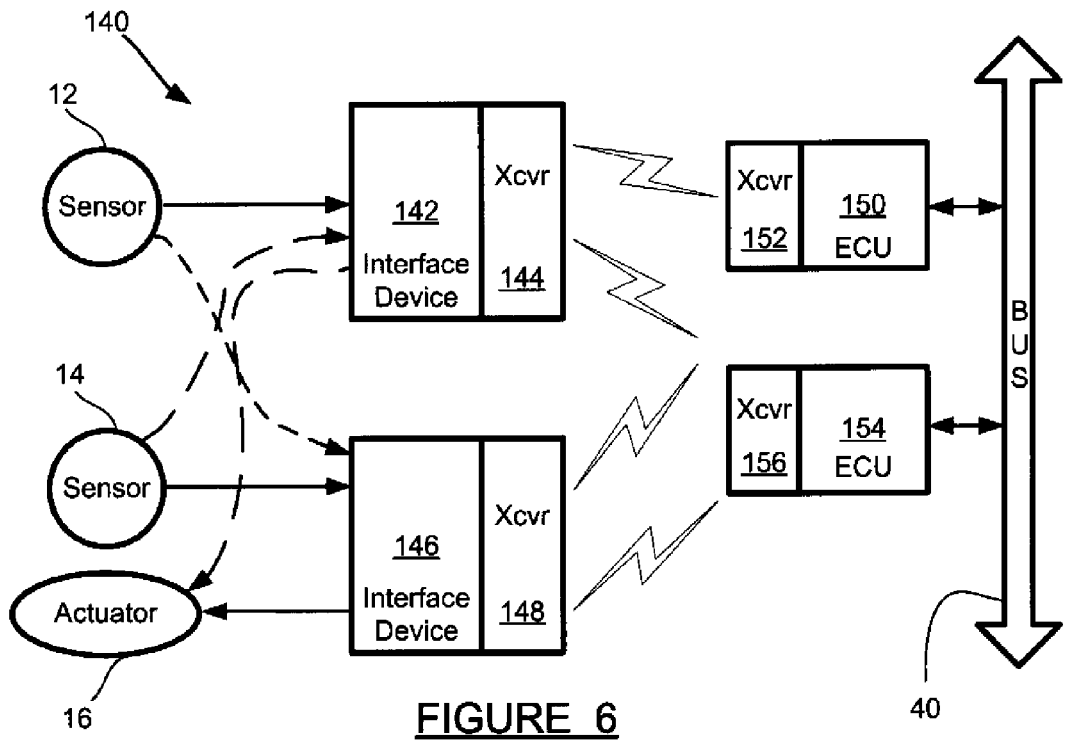
FIG. 6 is a schematic diagram of another embodiment of the flexible and fault tolerant architecture shown in FIG. 2, where the interface devices communicate wirelessly with the ECUs.

FIG. 6 is a schematic diagram of an architecture 140 representing another embodiment of the flexible and fault tolerant architecture shown in FIG. 2. In the architecture 140, interface devices 142 and 146 are equipped with wireless transceivers 144 and 148, respectively. Likewise, ECUs 150 and 154 are equipped with wireless transceivers 152 and 156, respectively. Thus, the interface devices 142 and 146 can communicate wirelessly with the ECUs 150 and 154, eliminating the need for physical wiring connections therebetween. This arrangement offers some design and packaging flexibility, such as positioning the interface devices 142 and 146 optimally based on sensor and actuator locations, which may be remote from optimal locations for the ECUs 150 and 154.

In this embodiment, each of the interface device wireless transceivers 144 and 148 would need to be able to communicate with each of the ECU wireless transceivers 152 and 156, in order to offer the failover flexibility discussed previously. That is, if the ECU 150 fails, for example, the interface device 142 needs to be able to wirelessly communicate with the ECU 154 in order to maintain system capability. If an interface device fails, the remaining functional interface device could communicate directly with both ECUs, or it could communicate with only one ECU, which could put messages destined for the other ECU on the bus 40.

Figure 7:
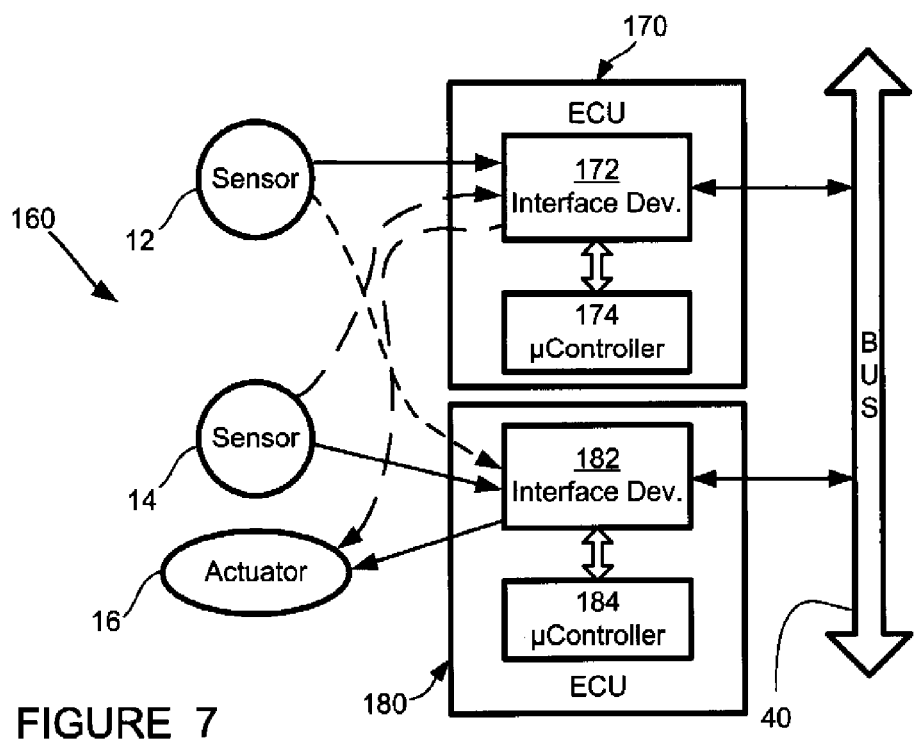
FIG. 7 is a schematic diagram of another embodiment of the flexible and fault tolerant architecture shown in FIG. 2, where the interface devices are integrated with the ECUs.

FIG. 7 is a schematic diagram of an architecture 160 representing another embodiment of the flexible and fault tolerant architecture shown in FIG. 2. In the architecture 160, ECU 170 includes an integrated interface device 172, and a microcontroller 174. The interface device 172 can communicate with the sensors 12 and 14 and the actuator 16, and also communicates with the bus 40. The interface device 172 contains a reconfigurable message table and a reconfigurable channel use table, as discussed previously for the interface device 72 in the architecture 70. Likewise, ECU 180 includes an integrated interface device 182, and a microcontroller 184. In this embodiment, the microcontrollers 174 and 184 perform the functions attributed to ECUs in previous embodiments, while the ECUs 170 and 180 serve as an integration platform with the interface devices.

In the same fashion as discussed previously, the interface devices 172 and 182 can be configured by way of their message tables and channel use tables to communicate as necessary with the sensors 12 and 14, the actuator 16, and the microcontrollers 174 and 184. For example, under normal conditions, the interface device 172 would receive data from the sensor 12 and provide the data directly to the microcontroller 174. If the interface device 172 were to fail, the microcontroller 184 would send a message to the interface device 182 instructing it to activate its input channel to the sensor 12, and to pass sensor 12 data to the microcontroller 184. At the same time, the microcontroller 184 would begin executing any tasks which had previously been executed by the microcontroller 174. It is also possible to reconfigure on a channel-by-channel basis. For example, the interface device 172 may lose communication with the sensor 12 due to a failure of an individual wire or connector. But if the interface device 172 is otherwise still operational, the data from the sensor 12 could be routed through the interface device 182, onto the bus 40, and through the interface device 172 to the microcontroller 174 which would continue to perform its task using the data from the sensor 12. Similar reconfiguration strategies can easily be envisioned to account for a failure of the microcontroller 174 or 184, or the entire ECU 170 or 180.

By providing a reconfigurable interface layer between the sensor/actuator layer and the ECU layer, thus decoupling the sensors and actuators from the ECUs, each of the architectures discussed above offers flexibility and fault tolerance not available in traditional electrical architectures. These capabilities enable component integration, cost reduction and reliability improvement opportunities for manufacturers of vehicles and other systems which make extensive use of networked electrical and electronic devices.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An automatically reconfigurable electrical network for a system, said network comprising:
   a plurality of sensors and actuators, where the sensors measure parameters of the system and the actuators perform an action in the system;
   two or more electronic control units (ECUs) for processing data from the sensors and issuing commands to the actuators;
   two or more interface devices for connecting the sensors and actuators to the ECUs, where each of the interface devices includes a communication controller, a reconfigurable channel use table, and a reconfigurable message table, said interface devices being software-reconfigurable to modify connectivity, where the message table for each of the interface devices can be reconfigured by a command from one of the ECUs to modify message source and destination device identifiers; and
   a communications bus for carrying messages between the interface devices and the ECUs.

2. The network of claim 1 wherein the ECUs monitor the network to detect an ECU failure or an interface device failure.

3. The network of claim 1 wherein each of the ECUs is configured to be capable of executing tasks which normally run on the other ECUs.

4. The network of claim 1 wherein the channel use table for each of the interface devices can be reconfigured by a command from one of the ECUs to modify input and output channel activity.

5. The network of claim 4 wherein the channel use table for one of the interface devices is reconfigured if one of the other interface devices fails.

6. The network of claim 1 wherein the message table for one of the interface devices is reconfigured if one of the ECUs fails.

7. The network of claim 1 wherein the communication controller in each of the interface devices uses information in the channel use table and the message table to route messages from the sensors to the ECUs and from the ECUs to the actuators.

8. The network of claim 1 wherein the system is a vehicle.

9. A reconfigurable electrical network, said network comprising:
one or more microcontrollers for processing data from sensors and issuing commands to actuators; and
two or more interface devices for connecting the sensors and the actuators to the microcontrollers, said interface devices including message tables and channel use tables which are software-reconfigurable to modify connectivity, where the message table for each of the interface devices can be reconfigured by a command from one of the microcontrollers to modify message source and destination device identifiers.

10. The network of claim 9 wherein each of the microcontrollers and each of the interface devices is equipped with a wireless transceiver such that each of the microcontrollers can wirelessly communicate with each of the interface devices.

11. The network of claim 9 wherein each of the interface devices is integrated with one of the microcontrollers in an electronic control unit (ECU).

12. The network of claim 9 further comprising a communications bus, said interface devices being connected to the communications bus.

13. A method for reconfiguring an electrical network, said network including first and second interface devices which handle communications between a sensor/actuator layer of the network and an electronic control unit (ECU) layer of the network, said method comprising:
monitoring operation of the network to detect an interface device failure or an ECU failure;
reconfiguring a message table in the first or second interface device to route sensor/actuator message traffic to a first ECU upon detection of a failure of a second ECU, including sending a message from the first ECU to the first or second interface device instructing the first or second interface device how to reconfigure, where the message table which contains a mapping of devices in the sensor/actuator layer with the first and second ECU; and
reconfiguring the message table and a channel use table in the first interface device to handle message traffic previously handled by the second interface device upon detection of a failure of the second interface device.

14. The method of claim 13 further comprising activating a task on the first ECU upon detection of a failure of the second ECU, where the task was previously executed on the second ECU.

15. The method of claim 13 wherein reconfiguring the first interface device to handle message traffic previously handled by the second interface device upon detection of a failure of the second interface device includes sending a message from the first or second ECU to the first interface device instructing the first interface device how to reconfigure.

16. The method of claim 15 wherein reconfiguring the first interface device includes modifying the channel use table which indicates which input and output channels should be used by the first interface device, and modifying the message table which contains a mapping of devices in the sensor/actuator layer with the first and second ECU.

* * * * *